United States Patent
Oytun Yazan et al.

(10) Patent No.: US 12,084,389 B2
(45) Date of Patent: Sep. 10, 2024

(54) METHOD FOR GRINDING A HYDRAULIC BINDER

(71) Applicant: CHRYSO, Issy les Moulineaux (FR)

(72) Inventors: Hüseyin Oytun Yazan, Avon (FR); Laurent Guillot, Vernon (FR); Pascal Boustingorry, Breuillet (FR)

(73) Assignee: CHRYSO, Issy les Moulineaux (FR)

( * ) Notice: Subject to any disclaimer, the term of this patent is extended or adjusted under 35 U.S.C. 154(b) by 411 days.

(21) Appl. No.: 17/433,036

(22) PCT Filed: Feb. 25, 2020

(86) PCT No.: PCT/EP2020/054878
§ 371 (c)(1),
(2) Date: Aug. 23, 2021

(87) PCT Pub. No.: WO2020/173927
PCT Pub. Date: Sep. 3, 2020

(65) Prior Publication Data
US 2022/0162130 A1    May 26, 2022

(30) Foreign Application Priority Data
Feb. 25, 2019    (FR) .................................. 19 01879

(51) Int. Cl.
*B02C 23/00* (2006.01)
*B02C 23/08* (2006.01)
(Continued)

(52) U.S. Cl.
CPC .......... *C04B 40/0046* (2013.01); *B02C 23/08* (2013.01); *B02C 23/12* (2013.01);
(Continued)

(58) Field of Classification Search
CPC ......... B02C 23/38; B02C 23/12; B02C 23/08; B02C 23/18
See application file for complete search history.

(56) References Cited

U.S. PATENT DOCUMENTS 1,361,205 A * 12/1920 Van Zandt .............. B02C 17/06
241/72
3,633,832 A * 1/1972 Fagerholt ................ B02C 17/04
241/176
(Continued)

FOREIGN PATENT DOCUMENTS

| GB | 970897 A | 9/1964 |
|---|---|---|
| WO | 2014/003972 | 1/2014 |

OTHER PUBLICATIONS

International Search Report for PCT/EP2020/054878 mailed May 15, 2020, 2 pages.
(Continued)

*Primary Examiner* — Faye Francis
(74) *Attorney, Agent, or Firm* — NIXON & VANDERHYE

(57) ABSTRACT

Disclosed is a method for grinding a hydraulic binder, including: a) introducing:—a hydraulic binder, and—a composition B including at least one grinding aid B into the first chamber of a horizontal grinder including several chambers, including a first chamber and a last chamber, each chamber being separated from the adjacent chamber by a diaphragm, whereby a composition β including the hydraulic binder and composition B is obtained in the first chamber; and b) grinding composition β in the horizontal grinder, whereby composition β moves from the first chamber to the last chamber and a ground composition C is obtained at the outlet of the last chamber. At the grinding step, the method includes introducing into the last chamber a composition A
(Continued)

including at least one grinding aid A including an aminoalcohol. Also disclosed is a corresponding grinding unit.

18 Claims, 8 Drawing Sheets

(51) Int. Cl.
    *B02C 23/12*     (2006.01)
    *B02C 23/18*     (2006.01)
    *B02C 23/38*     (2006.01)
    *C04B 24/02*     (2006.01)
    *C04B 24/12*     (2006.01)
    *C04B 40/00*     (2006.01)
    *C04B 103/52*     (2006.01)

(52) U.S. Cl.
    CPC .............. *B02C 23/18* (2013.01); *B02C 23/38* (2013.01); *C04B 24/02* (2013.01); *C04B 24/122* (2013.01); *C04B 2103/52* (2013.01)

(56) References Cited

U.S. PATENT DOCUMENTS

| | | | |
|---|---|---|---|
| 3,776,477 A | 12/1973 | Hansen et al. | |
| 5,251,830 A * | 10/1993 | Jiang | B02C 17/06 |
| | | | 241/153 |
| 9,114,401 B2 * | 8/2015 | Dumont | B02C 17/00 |
| 2017/0226011 A1 | 8/2017 | Müller et al. | |

OTHER PUBLICATIONS

Written Opinion of the ISA for PCT/EP2020/054878 mailed May 15, 2020, 5 pages.
Search Report for FR1901879 mailed Nov. 11, 2019, 2 pages.

* cited by examiner

METHOD FOR GRINDING A HYDRAULIC BINDER

BACKGROUND OF THE INVENTION

Field of the Invention

The present invention concerns a method for grinding a hydraulic binder such as cement.

Description of the Related Art

The method for preparing a hydraulic binder includes grinding to reduce the particle size of the binder, thereby increasing reactivity and imparting desired rheological properties thereto.

The use of a grinding aid allows improved yield of hydraulic binder grinding. Grinding aids allow:
- an increase in production when grinding, for one same energy consumption and one same fineness, or
- an increase in fineness, for one same energy consumption.

When a horizontal grinding mill is used having several grinding chambers for grinding a hydraulic binder, the grinding aid(s) is(are) injected into the first chamber of the grinding mill together with the hydraulic binder to be ground, or separately.

There is a need to develop a method for grinding a hydraulic binder allowing improved quality of the ground hydraulic binder (in particular Blaine fineness and/or particle size distribution) and/or improved grinding yield to reduce costs.

SUMMARY OF THE INVENTION

For this purpose, a first subject of the invention is a method for grinding a hydraulic binder, comprising:
a) introducing:
   a hydraulic binder, and
   a composition B comprising at least one grinding aid B,
      into the first chamber of a horizontal grinder comprising several chambers, including a first chamber and a last chamber, each chamber being separated from the adjacent chamber by a diaphragm,
      whereby a composition β comprising the hydraulic binder and composition B is obtained in the first chamber,
b) grinding composition β in the horizontal grinder, whereby composition β moves from the first chamber to the last chamber, and a ground composition C is obtained at the outlet of the last chamber,
characterised in that, at the grinding step, it comprises introducing into the last chamber a composition A comprising at least one grinding aid A comprising an aminoalcohol, composition A differing from composition β.

The method uses a horizontal grinder comprising several chambers (sometimes called «compartments»), including a first chamber and a last chamber, each chamber being separated from the adjacent chamber by a diaphragm. In general, the chambers have the same diameter and/or the last chamber is longer than the first chamber. Preferably, the grinding charge (metal balls . . . ) differs in size from one chamber to the next.

The first chamber is the chamber receiving the hydraulic binder to be ground. The last chamber is the chamber from which the ground composition C leaves the grinder. The ground composition C comprises the ground hydraulic binder, grinding aid A and grinding aid B.

Throughout grinding, the hydraulic binder moves from the first chamber to the adjacent chamber until reaching the last chamber. The diaphragm separating two adjacent chambers only allows particles of hydraulic binder to pass that are of sufficient reduced size for finer grinding in the following adjacent chamber. The particle size of the hydraulic binder is therefore largest in the first chamber and smallest in the last chamber.

Typically, the grinder only has two chambers: the first chamber and the last chamber (which is then the second chamber), these being separated by a diaphragm.

The grinder is generally a ball mill. The mean ball diameter in the first chamber is generally greater than the mean ball diameter in the last chamber.

The method comprises a step a) to introduce a hydraulic binder and a composition B comprising at least one grinding aid B into the first chamber of the grinder.

By the term «hydraulic binder» it is meant any compound having the property of becoming hydrated in the presence of water, the hydration of which allows a solid to be obtained having mechanical characteristics. The hydraulic binder can be a cement conforming to standard EN 197-1 of 2012, and in particular a cement of type CEM I, CEM II, CEM III, CEM IV or CEM V in accordance with cement standard NF EN 197-1 of 2012. The cement can therefore particularly comprise mineral additions.

The expression «mineral additions» designates slag (such as defined in cement standard NF EN 197-1 of 2012 paragraph 5.2.2), steelmaking slag, pozzolanic materials (such as defined in cement standard NF EN 197-1 paragraph 5.2.3), fly ash (such as defined in cement standard NF EN 197-1 paragraph 5.2.4), calcined schists (such as defined in cement standard NF EN 197-1 paragraph 5.2.5), limestone such as defined in cement standard NF EN 197-1 paragraph 5.2.6) or fumed silicas (such as defined in cement standard NF EN 197-1 paragraph 5.2.7) or the compositions thereof. Other additions, currently not recognized by cement standard NF EN 197-1 (2012), can also be used. These are chiefly metakaolins, such as type A metakaolins conforming to standard NF P 18-513 de 2012, and siliceous additions of Qz mineralogy conforming to standard NF P 18-509 of 2012.

In a first embodiment, grinding aid B comprises a polyol, preferably selected from among:
   a diol such as an alkylene glycol preferably having 1 to 20 carbon atoms, in particular 1 to 10 carbon atoms, the alkylene group thereof possibly carrying a methyl and typically being selected from among 2-methyl-1,3-propanediol, monoethyleneglycol, diethyleneglycol, triethyleneglycol, tetraethyleneglycol, propylene glycol and a mixture thereof,
   a triol, preferably glycerol,
   tetraol, preferably erythritol, and
   a mixture thereof.

Grinding aid B for example comprises an alkylene glycol, or a mixture of alkylene glycols and optionally glycerol, the glycerol preferably being contained in a proportion of 0 to 5% by weight relative to the weight of the assembly (glycerol and alkylene glycol(s)).

Grinding aid B (and composition B) are then preferably free of aminoalcohol, in particular of one of those listed below.

In a second embodiment, grinding aid B comprises an aminoalcohol or one of the salts thereof, said aminoalcohol preferably comprising:
   from 2 to 8 carbon atoms, in particular 4 to 6 carbon atoms, and/or
   1, 2 or 3 alcohol functions, selected for example from among N-methyldiethanolamine (MDEA), diisopropanolamine (DIPA), triisopropanolamine (TIPA), triethanolamine (TEA), ethanol-diisopropanolamine (EDIPA), diethanolisopropanolamine (DEIPA) and a mixture thereof. For example, grinding aid B comprises triisopropanolamine (TIPA), triethanolamine (TEA) or a mixture thereof. The preferred aminoalcohol salts are hydrochlorides such TEA.HCl, TIPA.HCl, EDIPA.HCl and DEIPA.HCl.

In this second embodiment, grinding aid B (and composition B) are preferably free of polyol, and in particular of one of those listed above.

This second embodiment is particularly adapted for grinding a soft hydraulic binder on which polyols could induce agglomeration harmful for grinding, and should therefore be avoided.

In a third embodiment, grinding aid B comprises a polyol and aminoalcohol.

In the second and third embodiments (when grinding aid B comprises an aminoalcohol), grinding aid B may comprise a carboxylic acid or salt thereof, selected for example from among acetic acid and one of the salts thereof, formic acid or one of the salts thereof, or a mixture thereof. Grinding aid B then comprises an aminoalcohol, a carboxylic acid or salt thereof and optionally a polyol. The salt can be the salt formed between the aminoalcohol and carboxylic acid. Carboxylic acid generally allows adjustment of the dispersing force of composition B, this force sometimes being too intense when aminoalcohol is used without carboxylic acid.

Grinding aid B is the active material of composition B. Composition B may comprise one or more grinding aids B.

In addition to grinding aid B, composition B may comprise a solvent, generally water. Composition B can be composed of an aqueous solution of at least one grinding aid B (this aid preferably being constituted of one or more polyols, one or more aminoalcohols or a mixture thereof, and optionally one or more carboxylic acids or a salt thereof when the grinding aid comprises and aminoalcohol), even of a mixture of water and grinding aid B.

The proportion of grinding aid B introduced into the first chamber at step a) is typically from 50 to 2500 g, in particular from 75 to 500 g, preferably from 90 to 250 g per tonne of hydraulic binder fed into the first chamber at step a). Below this value, the efficiency of the grinding aid decreases, and above this value costs become too high. The proportion relates to the «dry» grinding aid without taking into account any solvent or optional other additives in composition B. When composition B comprises several grinding aids B, it is the sum of their proportions that is taken into consideration.

The feeding of the hydraulic binder and composition B may or may not be simultaneous. In addition, the feeding of the hydraulic binder and composition B can be made via separate inlets of the first chamber or via one same inlet. For example, the first chamber can be charged with composition β comprising the hydraulic binder and composition B (introducing the hydraulic binder and composition B simultaneously via one same inlet). Preferably, composition B and the hydraulic binder are introduced simultaneously via one same inlet of the first chamber. Typically, composition B is dispersed in the hydraulic binder in the feed hopper of the hydraulic binder, for example via a spray ramp or a pipe releasing drops onto a hydraulic binder feed hopper. In this case, it is therefore composition β, which is introduced into the first chamber of the horizontal grinder.

The method comprises a step b) to grind composition β in the grinder, whereby composition β moves from the first chamber to the last chamber, and a ground composition C is obtained at the outlet of the last chamber. The mean particle size of composition C is therefore smaller than that of composition β. Measurement of particle size can be performed by laser particle size measurement giving a size distribution, or by sieving under pressure which typically gives a mass proportion of rejects on a defined screen mesh typically 32, 45 and/or 63 μm (on the understanding that the same measuring method must be used for size comparison).

At grinding step b) of the method of the invention, a composition A comprising at least one grinding aid A comprising an aminoalcohol is injected into the last chamber of the grinder.

Typically, composition A is injected into the last chamber:
  either at the diaphragm separating the last chamber from the adjacent chamber,
  or into the enclosure of the last chamber in a zone generally closer to the diaphragm, separating the last chamber from the adjacent chamber, than to the outlet of the last chamber,
or at the outlet of the last chamber, typically at the discharge grate equipping the outlet of the last chamber.

The method employs at least two grinding aids A and B which are introduced into different points of the grinder: one into the first chamber, the other into the last chamber.

The inventors have shown that the grinding aids A and B are not distributed in the same manner within the grinding unit: the dosage of a grinding aid along the grinding unit varies as a function of the type of grinding aid. When the grinding aids are both introduced into the first chamber as in the prior art:
  the quantity of grinding aid found on the particles of hydraulic binder is essentially governed by the specific surface area of the hydraulic binder particles as soon as they leave the first chamber of the grinder;
  inside the first chamber of the grinder, when grinding aid B comprises an alkylene glycol, it is more abundant per unit surface area of hydraulic binder than grinding aid A comprising an aminoalcohol,
  the quantity of grinding aid per unit surface area of hydraulic binder stabilises in the second chamber of the grinder, and the difference between the two grinding aids decreases in the last chamber.

Grinding aid A, comprising an aminoalcohol, generally has good capability of fluidifying the flow of particles, which is not the case of a grinding aid comprising an alkylene glycol. Without wishing to be bound by any particular theory, in the light of the following examples, the inventors assume that:
  the grinding aids are conveyed by the hydraulic binder particles of large specific surface area, and hence by the small size particles;
  this effect would be amplified if the grinding aid has a fluidifying effect, which is the case for grinding aid A comprising an aminoalcohol, which increase the flow rate of hydraulic binder particles of small size. Grinding aid A comprising an aminoalcohol is therefore less abundant in the first grinding chamber which comprises hydraulic binder particles of large size.

This demonstrates the advantage of introducing the two grinding aids at different points on the grinding line: grinding aid B in the first chamber to allow a sufficiently long residence time of the hydraulic binder in the grinder, and grinding aid A comprising an aminoalcohol in the last chamber, to remove small-sized particles from the grinder and/or to fluidify the particles of the ground composition C thereby improving subsequent processability thereof and facilitating any subsequent separation (second alternative described below).

Composition A differs from composition β. In other words, composition A injected into the last chamber is not the composition undergoing grinding in the grinder.

Grinding aid A comprises at least one aminoalcohol preferably comprising:
- from 2 to 8 carbon atoms, in particular 4 to 6 carbon atoms, and/or
- 1, 2 or 3 alcohol functions, e.g. selected from among N-methyldiethanolamine (MDEA), diisopropanolamine (DIPA), triisopropanolamine (TIPA), triethanolamine (TEA), ethanol diisopropanolamine (EDIPA), diethanolisopropanolamine (DEIPA) and a mixture thereof. For example, grinding aid A comprises triisopropanolamine (TIPA), triethanolamine (TEA) or a mixture thereof.

Grinding aid A may comprise a carboxylic acid or salt thereof, selected for example from among acetic acid or one of the salts thereof, formic acid or one of the salts thereof, or a mixture thereof. Grinding aid A therefore comprises an aminoalcohol and a carboxylic acid or a salt thereof. The salt can be the salt formed between the aminoalcohol and carboxylic acid. Carboxylic acid generally allows adjustment of the dispersing force of composition A, this sometimes being too intense when aminoalcohol is used without carboxylic acid.

In one embodiment, grinding aid A is the same as grinding aid B. Composition A can be the same as composition B.

In another embodiment, grinding aid A differs from grinding aid B. Composition A differs from composition B.

Grinding aid A is the active material of composition A. Composition A may comprise one or more grinding aids A.

In addition to grinding aid A, composition A may comprise a solvent, generally water. Composition A can be constituted of an aqueous solution of at least one grinding aid A, even of a mixture of water and grinding aid A.

The proportion of grinding aid A injected into the last chamber at step b) is typically from 50 to 2500 g, in particular from 75 to 500 g, preferably from 90 to 250 g per tonne of hydraulic binder fed into the first chamber at step a). Below this value the efficiency of the grinding aid decreases, and above this value the costs become too high. This proportion relates to the «dry» grinding aid without taking into account any solvent and optional other additives to composition A. When composition A comprises several grinding aids A, it is the sum of their proportions that is taken into consideration.

At grinding step b), air can be circulated from the first chamber towards the last chamber. Air enters via the first chamber and leaves via the last chamber. This air allows displacement of the most volatile particles of composition β undergoing grinding. The method may then comprise, after step b):
- i) filtering the air leaving the last chamber, whereby the most volatile ground particles of hydraulic binder are recovered; then
- ii) grouping the recovered most volatile particles with the ground composition C, generally via flow under an air stream.

In a first alternative, after step b) the method comprises a step b1) to recover the ground composition C. Ground composition C then has the desired size/specific surface area. The method can then be implemented by continuous, semi-continuous or batch process.

In this first alternative, the main advantage of injecting composition A comprising at least one grinding aid A comprising an aminoalcohol into the last chamber is to obtain fluidification of the ground composition C, which improves subsequent processability thereof since ground composition C is more fluid facilitating the flow thereof for example in a silo or when loading or unloading a truck. In general, the required dosage of grinding aid A comprising an aminoalcohol to obtain suitable fluidity of the ground composition C is higher than the dosage required for efficient grinding of the hydraulic binder. It is therefore of advantage to inject grinding aid A into the last chamber of the grinder, including in the embodiment in which grinding aid A is injected at the outlet of the last chamber typically at the discharge grate equipping the outlet of the last chamber.

In a second alternative, the method after step b) comprises:
- c) separating, by a separator, composition C ground into fines and separator rejects, where the mean particle size of the separator rejects is greater than that of the fines;
- d) recovering the fines;
- e) returning the separator rejects to the first chamber of the horizontal grinder.

In this second alternative, the method comprises a separation step c) between composition C ground into fines and separator rejects.

The inventors have shown that:
- separation is more efficient the greater the quantity of grinding aid A or B, until limit efficacy is reached;
- separation efficacy is dependent on the grinding aid used. Separation is more efficient with grinding aid A comprising an aminoalcohol than with a grinding aid comprising a polyol.

Therefore, injecting grinding aid A comprising an aminoalcohol into the last chamber of the grinder allows better fluidification of the ground composition C at the time of separation and makes separation more efficient.

Additionally, the introduction of composition A comprising at least one grinding aid A comprising an aminoalcohol into the last chamber also has the advantage of fluidifying the ground composition C, and the recovered fines, which improves the subsequent processability thereof since the fines have more fluid flow e.g. in a silo or when loading or unloading a truck. In general, the required dosage of grinding aid A comprising an aminoalcohol to obtain acceptable fluidity of recovered fines is greater than that required for efficient grinding of the hydraulic binder.

In this second alternative, steps i) and ii) defined above, when performed, are preferably followed by a step iii) to return the particles grouped with ground composition C back to the separator. Steps i), ii) and iii) are implemented between steps b) and c).

In this second alternative, the fines are recovered at step e). It is the composition of hydraulic binder ground to the desired size/specific surface area which is obtained with the method. Typically, when the hydraulic binder is cement, the specific surface area of the fines measured with the Blaine method is of the order of 3200 to 4500 $cm^2/g$.

The separator rejects comprise particles that are too large for the desired size. They are returned to the first grinding chamber to be re-ground. Therefore, composition β contained in the first chamber comprises, even consists of, the hydraulic binder, separator rejects and composition B (bearing in mind that the rejects comprise hydraulic binder, grinding aid A and grinding aid B).

In general, in this second alternative, the grinding method is a continuous process.

A second subject of the invention is a grinding unit intended to implement the method of the invention, comprising:
- a source of hydraulic binder;
- a source of composition B comprising at least one grinding aid B;
- a source of composition A comprising at least one grinding aid A comprising an aminoalcohol;
- a horizontal grinder comprising several chambers, including a first chamber having at least one inlet and a last chamber having an outlet, each chamber being separated from the adjacent chamber by a diaphragm, characterized in that the last chamber is equipped with an inlet connected to the source of composition A.

The above-described embodiments, in particular those for the grinder, are applicable.

In general, the last chamber extends from the diaphragm separating the last chamber from the adjacent chamber as far as the discharge grate, which is able to let ground composition C be discharged from the grinder. Typically, the inlet of the last chamber connected to the source of composition A is positioned:
- either at the diaphragm separating the last chamber from the adjacent chamber;
- or in the enclosure of the last chamber in a zone generally closer to the diaphragm, separating the last chamber from the adjacent chamber, than to the outlet of the last chamber;
- or at the outlet of the last chamber, typically at the discharge grate equipping the outlet of the last chamber.

If the grinder is a ball grinder, the outlet of the last chamber is generally equipped with a discharge grate configured to prevent the grinding balls from leaving the grinder.

Typically, the grinder has only two chambers: the first chamber and last chamber (which is then the second chamber), these being separated by a diaphragm.

The grinder is typically configured so that air is able to circulate from an inlet of the first chamber towards the outlet of the second chamber. The unit comprises a filter connected to the outlet of the last chamber and configured to filter air and to recover the most volatile particles of ground hydraulic binder.

In a first alternative, the grinding unit does not have a separator. This first alternative of the grinding unit allows implementation of the first alternative of the method described above.

In this first alternative of the unit, the filter if any is configured to filter air, to recover the most volatile particles of the ground hydraulic binder and to return these to the ground composition C.

In this first alternative, the first chamber is:
- either equipped with a single inlet connected to the source of hydraulic binder and to the source of composition B,
- or equipped with two inlets, the first inlet being connected to the source of hydraulic binder and the second inlet being connected to the source of composition B.

In a second alternative, the grinding unit comprises a separator. The separator is typically a dynamic air or cyclonic separator with rotating chamber or a static filter separator, or a combination thereof. The outlet of the last chamber of the grinder is then generally connected to the inlet of a separator able to separate the particles according to size and provided with two outlets, one of the outlets being connected to an inlet of the first chamber of the horizontal grinder. This second alternative of the grinding unit allows implementation of the second alternative of the above-described method. The grinding unit then comprises a closed circuit since the outlet of the last grinding chamber is connected to the inlet of the separator of which one of the outlets is connected to the first chamber of the grinder.

In this second alternative, the first chamber is:
- either equipped with a single inlet connected to the source of hydraulic binder, to the source of composition B and to an outlet of the separator;
- or equipped with two inlets, the first inlet being connected to the source of hydraulic binder and source of composition B, the second inlet being connected to an outlet of the separator;
- or equipped with three inlets, the first inlet being connected to the source of hydraulic binder, the second inlet being connected to the source of composition B and the third inlet being connected to an outlet of the separator.

In this second alternative of the unit, the filter if any is positioned between the last chamber of the grinder and the separator. The filter is configured to filter air, to recover the most volatile particles of hydraulic binder and to return these to the separator.

The invention is illustrated in connection with the following examples and appended Figures.

DESCRIPTION OF THE PREFERRED EMBODIMENTS

Figure 1:
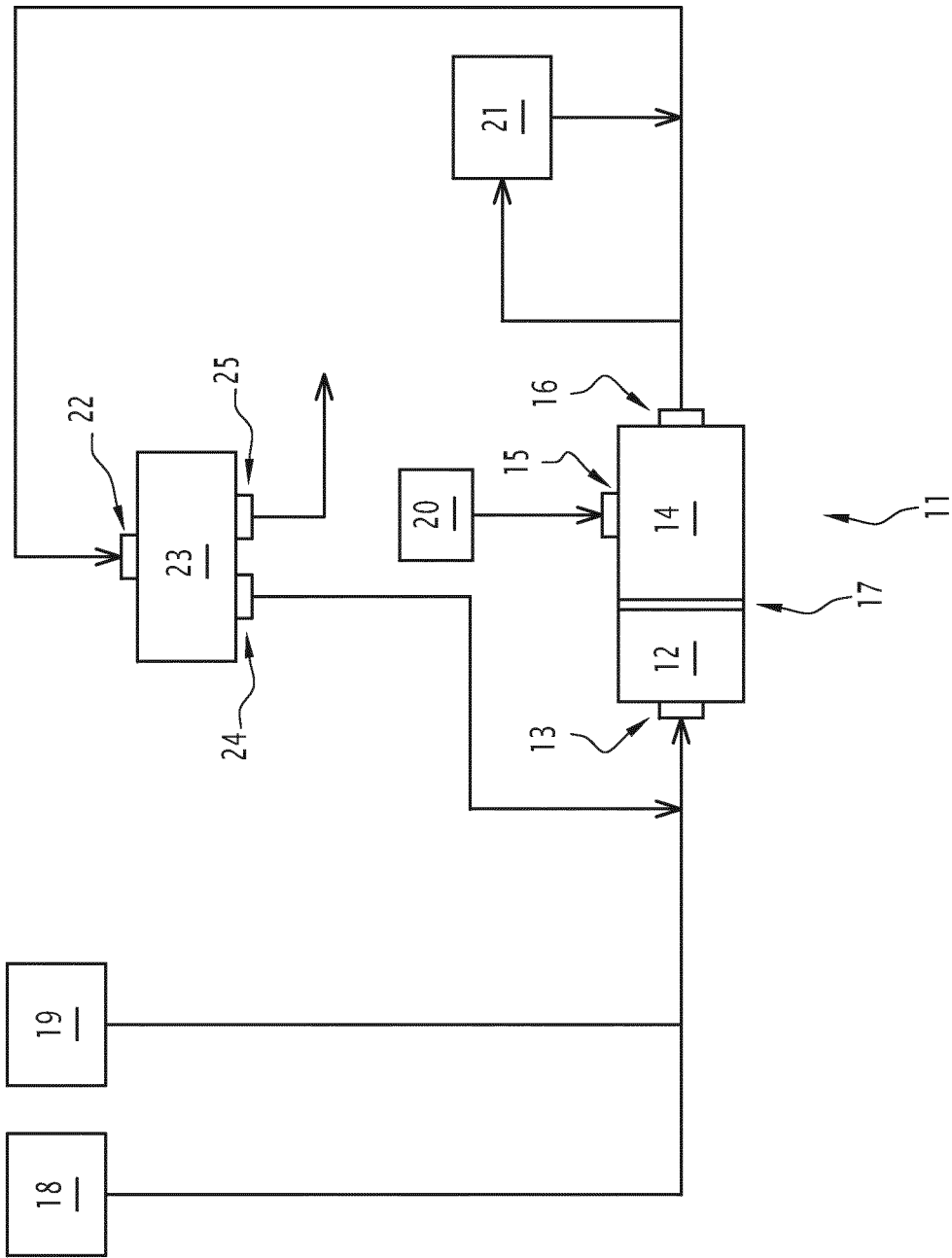
FIG. 1: Schematic of a grinding unit according to the second alternative of the invention.

FIG. 1 illustrates a grinding unit according to the second alternative of the invention, in the case in which the grinding unit comprises a filter. A horizontal grinder 11 comprising two chambers:
  a first chamber 12 equipped with a first inlet 13; and
  a second chamber (last chamber) 14 equipped with an inlet 15 and outlet 16, the first chamber 12 being separated from the second chamber 14 by a diaphragm 17. The inlet 13 of the first chamber 12 is connected to a hydraulic binder source 18, to a source 19 of composition B, and to an outlet 24 of the separator 23. The inlet 15 of the second chamber 14 is connected to the source 20 of composition A. The grinder 1 is configured so that air is able to circulate from the inlet 13 of the first chamber towards the outlet 16 of the second chamber 14. The outlet 16 of the second chamber 14 is connected to:
  a filter 21 configured to filter air and to return the filtered particles to the inlet 22 of a separator 23; and
  the inlet 22 of the separator 23 able to separate the particles according to particle size and equipped with two outlets: an outlet 24 connected to the inlet 13 of the first chamber 12 and an outlet 25.

The points 1, 2, 3, 4, 5 and 6 do not correspond to elements of the unit but indicate the different points where samples are taken, with reference to the following examples.

EXAMPLES

In the following examples, the grinding aids A and B have been fed in varying methods, either into the first chamber 12 via inlet 13, or at the discharge grate equipping the outlet 16 of the second chamber, or at both these points. The experiments conducted evidence the distribution of grinding aid A comprising an aminoalcohol or of grinding aid B comprising an alkylene glycol, and the impact thereof on particle size and cement flow, as well as the flow rates of material in the method, and show the advantage of injecting grinding aid A into the second chamber 14 of the horizontal grinder 11.

Example 1

Materials

The tested cement was of CEM I 42.5R type (94% clinker; 5.5% gypsum; 5.5% limestone).

The grinding aids were specifically formulated for the study. Their compositions are given in Table 1 below:

TABLE 1

Composition of the grinding aids A and B used in Example 1

| | Compounds | Active material (%) |
|---|---|---|
| Grinding aid A comprising an aminoalcohol | Water | |
| | Triethanolamine | 8.33 |
| | Triisopropanolamine (diluted) | 33.33 |
| Grinding aid B comprising an alkylene glycol | Waater | |
| | Diethylene glycol | 22.70 |
| | Glycerol (diluted) | 12.09 |

Figure 2:
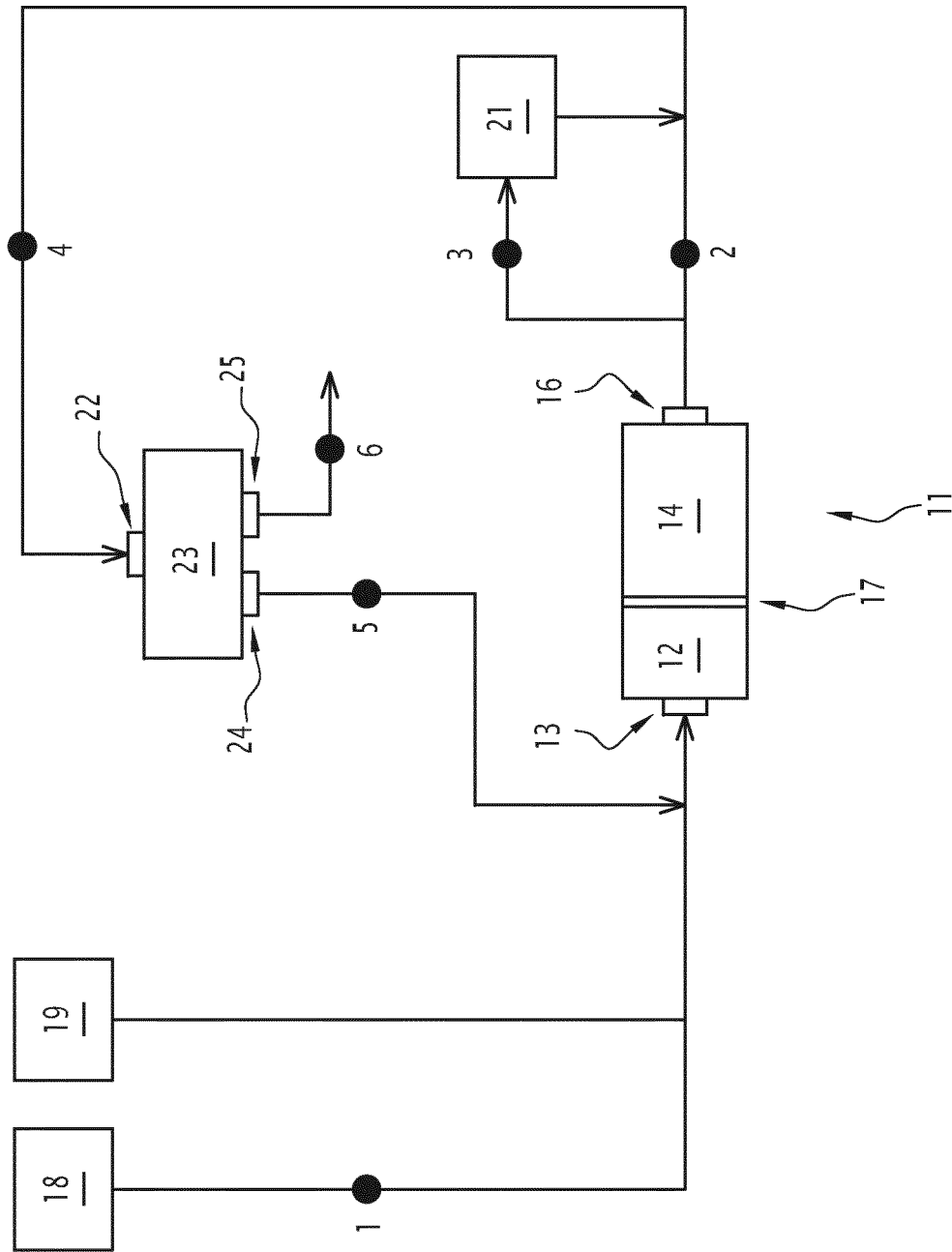
FIG. 2: Schematic of a prior art grinding unit and such as used in Example 1, indicating the sampling points 1, 2, 3, 4 5 and 6 for Example 1.

The grinding unit used is such as illustrated in FIG. 2.

The horizontal grinder 11 comprised two chambers separated by a diaphragm 17.

For a cement without grinding aid, and for cements each containing grinding aids at different concentrations, samples were taken at different points on the circuit shown in FIG. 2, once the state of equilibrium had been reached on the grinding line.

Also, for cements containing grinding aids, samples were taken every 1.2 m in the first chamber 12 of the horizontal grinder 11 and at every metre in the second chamber.

In this first example, the grinding aid in liquid form was injected dropwise into the feed hopper of the hydraulic binder. The mixture of hydraulic binder and grinding aid was fed into the inlet 13 of the horizontal grinder 1.

Table 2 below summarises the different analysed samples

TABLE 2

Samples taken along the grinding line-initial dosages

| Test | Grinding aid | Initial dosage (ppm) | Dry * dosage (ppm) | Reference given to dosage | Samples taken in the grinder | Samples taken along the circuit (Points 2, 3, 4, 5, 6) |
|---|---|---|---|---|---|---|
| T3 (ref) | None | 0 | 0 | | X | X |
| T4 | Grinding aid | 250 | 104 | D1 | | X |
| T5 | A comprising | 350 | 146 | D2 | | X |
| T6 | an aminoalcohol | 450 | 187 | D3 | X | X |
| T7 | Grinding aid | 300 | 104 | D1 | | X |
| T8 | B comprising | 400 | 139 | D2 | | X |
| T9 | an alkylene glycol | 500 | 174 | D3 | X | X |

\* Dosage of active material without taking water into account.

Test T3, without grinding aid, is the reference for the study. The different initial dosages are called D1, D2 and D3 hereafter

Methods

Mixing

A Kenwood Chef Elite mixer KVC5305S was used to mix the cement and ultrapure water with the desired water/cement ratio («W/C» hereafter). 400 g of cement were added to ultrapure water prepared in the bowl of the mixer, following the sequence indicated in Table 3:

TABLE 3

Mixing protocol

| Time | Speed (rpm) | Action |
|---|---|---|
| 0'-30" | 43 | Pouring of powder |
| 30"-1' | 96 | Mixing |
| 1'-1'30 | 0 | Scraping edges |
| 1'30-2'30 | 96 | Mixing |

If there were many coarse particles in the cement, mixing was performed manually. The cement was added to the ultrapure water for 30 s after which the paste was mixed with a spatula for 2 min.

Assay of Grinding Aids

Assay of grinding aids was obtained by washing the cement and measuring the carbon concentration in the cement grout.

The cement was mixed with ultrapure water following the above-described mixing protocol, then left to stand for 30 min. After manual homogenisation, the grout was filtered through a Büchner, and the filtrate collected in a haemolysis tube after 0.2 µm filtration, and acidified to overcome any carbonatation. These solutions were passed through a Total Organic Carbon analyzer («TOC» hereafter) to determine the carbon concentrations.

The amount of carbon in the cement without grinding aid was deducted from measurements taken on the cements containing a grinding aid.

To verify that the grinding aid had no adsorption isotherm on the solid phase in water, measurements were taken with two water/cement W/C ratios: 0.4 and 0.6, on samples of fine particles taken at outlet 25 of the W/C separator (tests T3, T6, T9, point (6) on the grinding circuit). In the absence of an adsorption isotherm, the ratio of carbon in solution/cement is not dependent on the initial W/C ratio, and the entirety of the grinding aid is assayed.

Measurement of Total Organic Carbon (TOC) was performed on the acidified filtrates using a SHIMADZU TOC-VCPN analyzer. TOC was calculated by the difference between the quantity of total carbon (obtained by carbonisation of the solution and measurement of the quantity of $CO_2$ released under infrared) and the quantity of inorganic carbon (obtained by acidification of the solution to pH<1 and release of dissolved $CO_2$ by bubbling with synthetic air). A calibration curve for each of the grinding aids allowed determination of the concentration thereof in the cement grouts. It is expressed in g/L.

Results

The quantities of grinding aid are expressed in ppm (g dry weight of grinding aid per tonne of cement) or in $g/m^2$ (g dry weight of grinding aid per square metre of cement surface area).

TOC Calibration

The calibration curves obtained for grinding aid A comprising an aminoalcohol and for grinding aid B comprising an alkylene glycol showed a coefficient of correlation of 1, and were therefore able to be used to calculate the quantity of grinding agent from the quantity of TOC measured in the samples.

The concentration of grinding aid A ($C_A$) comprising an aminoalcohol was therefore calculated from the TOC value according to:

$C_A = 0.0019 * TOC + 0.0115$

The concentration of grinding aid B ($C_B$) comprising an alkylene glycol was therefore calculated from the TOC value according to:

$C_B = 0.0026 * TOC + 0.0111$

Verification of Cement Washing

To ensure the absence of adsorption isotherm of the grinding aids on the cement, TOC measurements were taken with two W/C ratios: 0.4 and 0.6, for tests T6 and T9, at points (6) and the results were as follows:

TABLE 4

Efficacy of cement washing - TOC value as a function of W/C ratio

| Test | TOC value at W/C 0.4 (ppm) | TOC value at W/C 0.6 (ppm) |
|---|---|---|
| T6 (6) | 149 | 146 |
| T9 (6) | 132 | 137 |

The results show that the TOC values are not substantially dependent on the W/C ratio. The grinding aids are not adsorbed on the surface of the cement particles, and washing is therefore efficacious for determining the quantity of grinding aid in the different samples.

For the experiments described below, the cements were analysed with a W/C ratio of 0.4, to obtain a stronger concentration of carbon in solution.

TOC on Samples not Containing a Grinding Aid—Test T3

TOC was measured at points (2), (3), (4), (5) and (6) on the grinding line and inside the horizontal grinder 11, on samples ground without grinding aid (reference). The TOC values related to cement weight are given in Tables 5 to 7:

TABLE 5

TOC values on the different samples taken outside the grinder

| Point on grinding line | TOC (ppm of cement) |
|---|---|
| (2) Grinder surplus | 2.8 |
| (3) Filter | 4.6 |
| (4) Separator feed | 3 |
| (5) Separator rejects returned to the grinder | 2.4 |
| (6) Fines leaving the separator | 3.5 |

TABLE 6

TOC inside the grinder, 1st chamber

| Distance from inlet (m) | TOC (ppm of cement) |
|---|---|
| 0 | 1.3 |
| 1.2 | 4.2 |
| 2.4 | 2.1 |
| 3.6 | 1.9 |

TABLE 7

| TOC inside the grinder, 2$^{nd}$ chamber | |
|---|---|
| Distance from diaphragm 17 (m) | TOC (ppm de ciment) |
| 0 | 2.2 |
| 1 | 3.1 |
| 2 | 2.5 |
| 3 | 2.8 |
| 4 | 5.0 |
| 5 | 2.5 |
| 5.9 | 3.1 |

The cement of the samples in the tests conducted without grinding aid contained less than 5 ppm TOC along the grinding line.

In the corresponding samples containing grinding aid in the experiments described below, this quantity was deducted so as only to take into account the grinding aid.

TOC on Samples Ground with Grinding Aids

The results are expressed in dry dosage of grinding aid per tonne of cement or ppm.

Influence of Initial Dosage

Each grinding aid was fed at three initial dosages D1, D2 or D3 (Table 2). The quantities of grinding aid measured in the different cement samples are given in Table 8 below.

TABLE 8

| Active material by weight of cement for each of the samples | | | | | | | |
|---|---|---|---|---|---|---|---|
| | | Initial dosage of grinding aid A comprising an aminoalcohol | | | Initial dosage of grinding aid B comprising an alkylene glycol | | |
| | | D1 | D2 | D3 | D1 | D2 | D3 |
| Active material by weight of cement (g/t, BWOC) | (2) Grinder surplus | 65 | 80 | 97 | 61 | 64 | 84 |
| | (3) Filter | 134 | 108 | 150 | 97 | 92 | 120 |
| | (4) Separator feed | 72 | 86 | 107 | 52 | 63 | 85 |
| | (5) Separator rejects returned to grinder | 33 | 35 | 44 | 32 | 37 | 40 |
| | (6) Fines leaving separator | 92 | 108 | 142 | 93 | 99 | 123 |

It was observed that:
- The quantity of grinding aid in the cement at different points along the grinding line increases with initial dosage, with the exception of the filter 21 in which the dosage measured for dosage D1 is higher than that measured for dosage D2, irrespective of grinding aid.
- In the filter 21, for grinding aid A comprising an aminoalcohol at dosage D1, the quantity of grinding aid measured in the cement is higher than the initial dosage. The inventors assume that this excess could be due to the quantity of grinding aid on the surface of the particles of separator rejects reinjected into the grinding line, or to adsorption of grinding aid in suspension in the circuit.

The dosage of grinding agent on large particles (those of separator rejects returned to the horizontal grinder 11) is lower than on the particles of small size (Fines leaving the separator). More specifically, the inventors have observed that, for both grinding aids, the quantity of active material of the grinding aids measured in the different samples is correlated with the specific surface area of the cement particles, as per the following equation:

quantity of active material (in g/t)=−0.0329*(specific surface area of the cement (in cm$^2$/g))−1.637 with a coefficient of correlation $R^2$ of 0.9528.

The measured quantities of grinding aid were therefore related to the specific surface area of the particles and are given in Table 9 below.

TABLE 9

Active material per m² of cement for each of the samples

| | | Initial dosage of grinding aid A comprising an aminoalcohol | | | Initial dosage of grinding aid B comprising an alkylene glycol | | |
|---|---|---|---|---|---|---|---|
| | | D1 | D2 | D3 | D1 | D2 | D3 |
| Active material (g) per m² of cement | (2) Grinder surplus | 2.0 | 2.5 | 3.2 | 2.1 | 2.5 | 3.0 |
| | (3) Filter | 2.5 | 2.4 | 3.1 | 2.4 | 2.3 | 2.9 |
| | (4) Separator feed | 2.1 | 2.5 | 3.3 | 1.7 | 2.0 | 2.9 |
| | (5) Separator rejects returned to grinder | 1.9 | 2.3 | 3.0 | 1.8 | 2.2 | 2.7 |
| | (6) Fines leaving the separator | 2.3 | 2.7 | 3.6 | 2.4 | 2.6 | 3.3 |

Expressed in g per m² of cement, the difference between the quantities of grinding aid at the different points of the circuit decreases for one same initial dosage: the specific surface area of the cement particles and hence their particle size governs the interactions between the grinding aids and the cement.

Separator Efficiency—Fish-Hook (β) and Bypass Complement (C)

Figure 3:
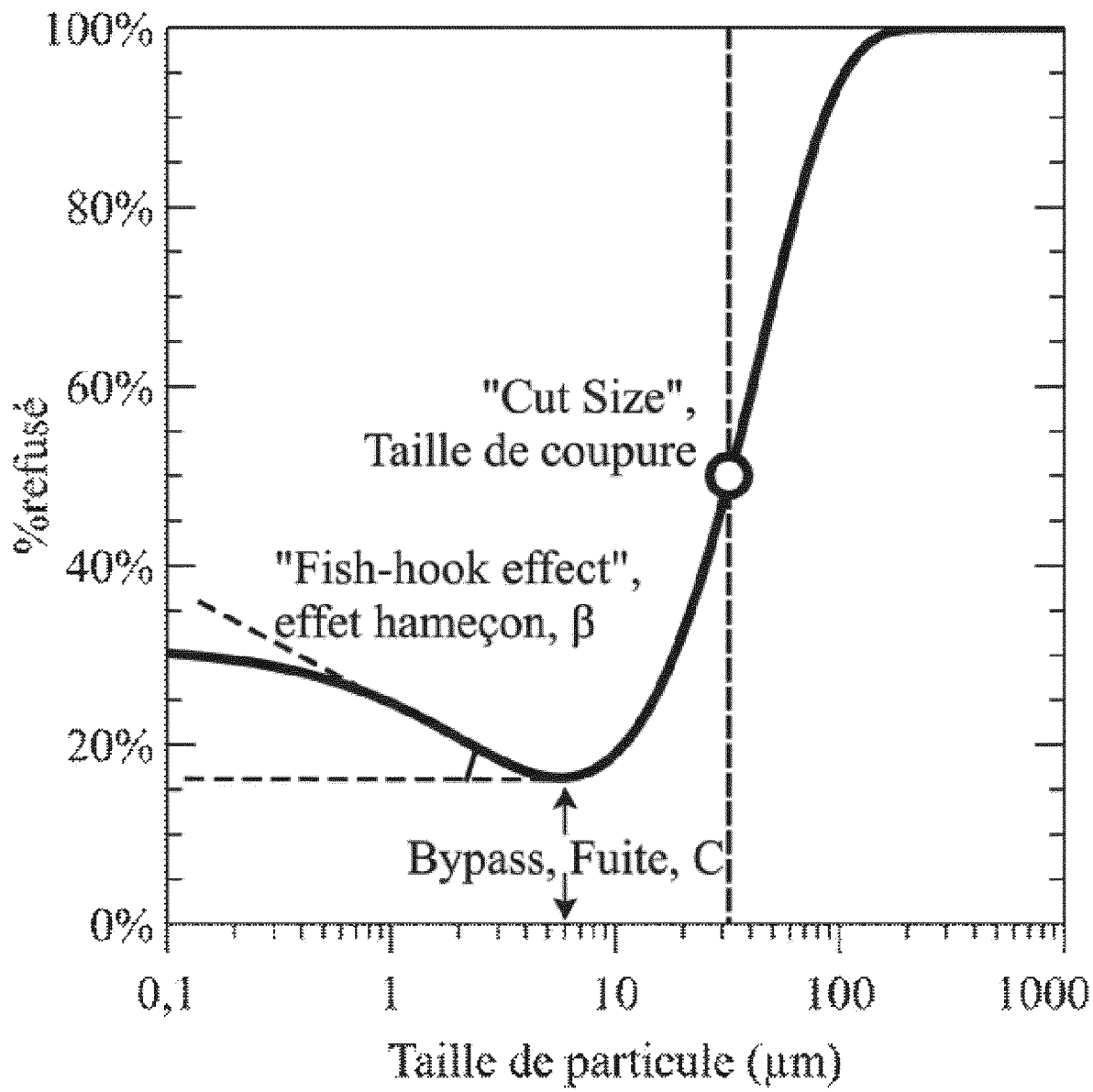
FIG. 3: Example of a Tromp curve. Percentage of separator rejects returned to the grinder as a function of particle size in µm.

The Tromp curve describes the efficacy of a separator. It is calculated for each particle size class as the ratio between the flow of separator rejects (returned to the horizontal grinder 11) and the flow of separator feed. In the case of perfect separator efficacy, the percentage of rejects would be zero up until the maximum acceptable particle size is reached, and then 100%. In actual cases, the Tromp curve of the separator has the shape given in FIG. 3.

Bypass evidences that there exists, for every class of particle size, a fraction of particles that is always reinjected into the horizontal grinder 11. Separator efficiency is described by:

C=1-bypass the separator is all the more efficient the higher the value of C

The «Fish Hook» is that part of the curve at which particle size is smaller than that corresponding to the bypass, and evidences escape of fines towards the horizontal grinder 11. The gentler the slope (β) the lesser the quantity of fines returned to the horizontal grinder 11 and the better the efficiency of the separator.

Figure 4:
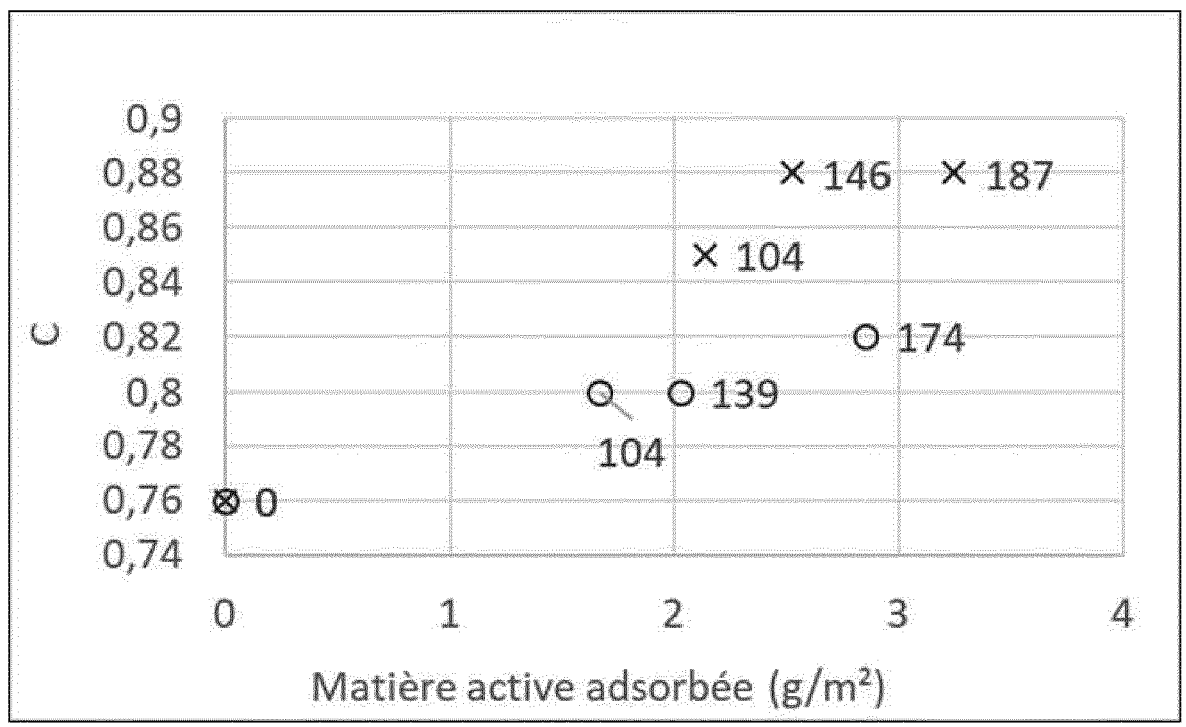
FIG. 4: Efficiency C of the separator as a function of the quantity of grinding aid entering the separator for each grinding aid and each dosage of grinding aid measured in $m^2$ of cement. The values indicated in the graphs correspond to the initial dry dosages in ppm of grinding aid relative to cement weight. The crosses correspond to grinding aid A comprising an aminoalcohol and the circles to grinding aid B comprising an alkylene glycol.
Figure 5:
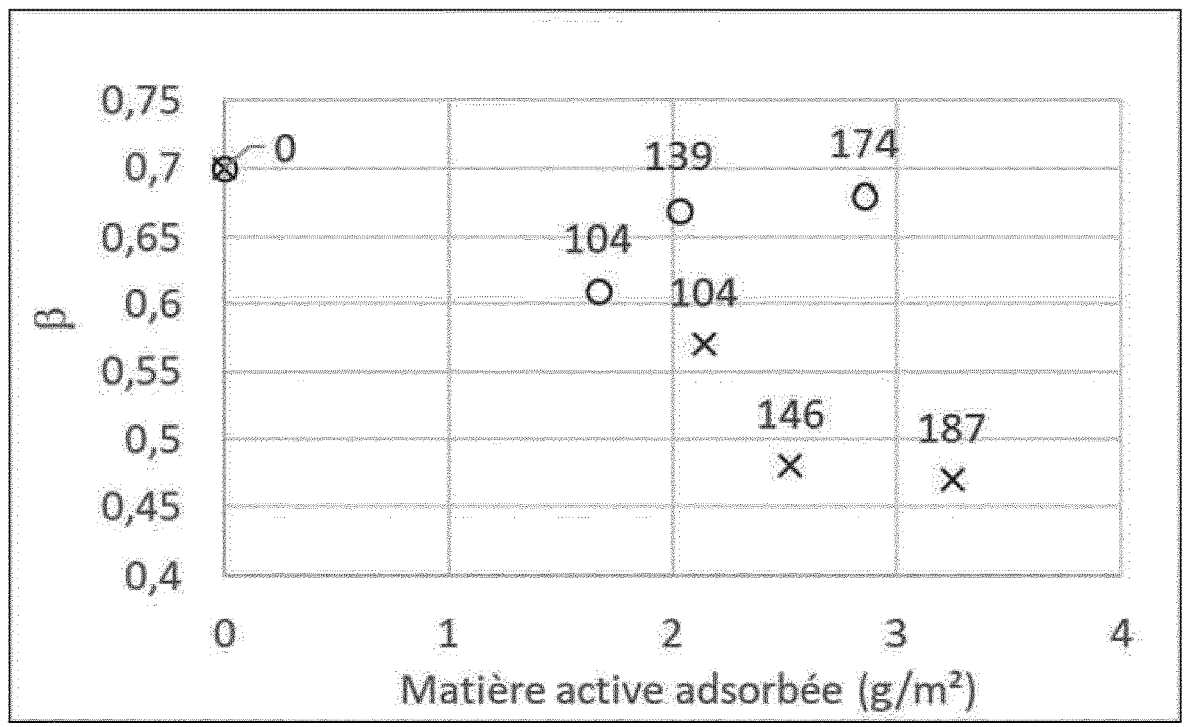
FIG. 5: Slope β of the separator fish-hook as a function of the quantity of grinding aid entering the separator for each grinding aid and each dosage of grinding aid measured in $m^2$ of cement. The crosses correspond to grinding aid A comprising an aminoalcohol and the circles to grinding aid B comprising an alkylene glycol. The values indicated in the graphs correspond to the initial dry dosages in ppm of grinding aid relative to cement weight.

The results given in FIG. 4 and FIG. 5 show that separator efficiency is dependent on the grinding aid used:

C is always higher and β lower with grinding aid A comprising an aminoalcohol;

β exhibits non-monotone variation with the initial dosage of grinding aid B comprising an alkylene glycol, and decreases monotone fashion when the initial dosage of grinding aid A comprising an aminoalcohol increases.

limit separator efficiency is reached on and after the intermediate dosage of grinding aid A comprising an aminoalcohol (C no longer varies, β stabilises)

Inside the Grinder—Tests T6 and T9

Figure 6:
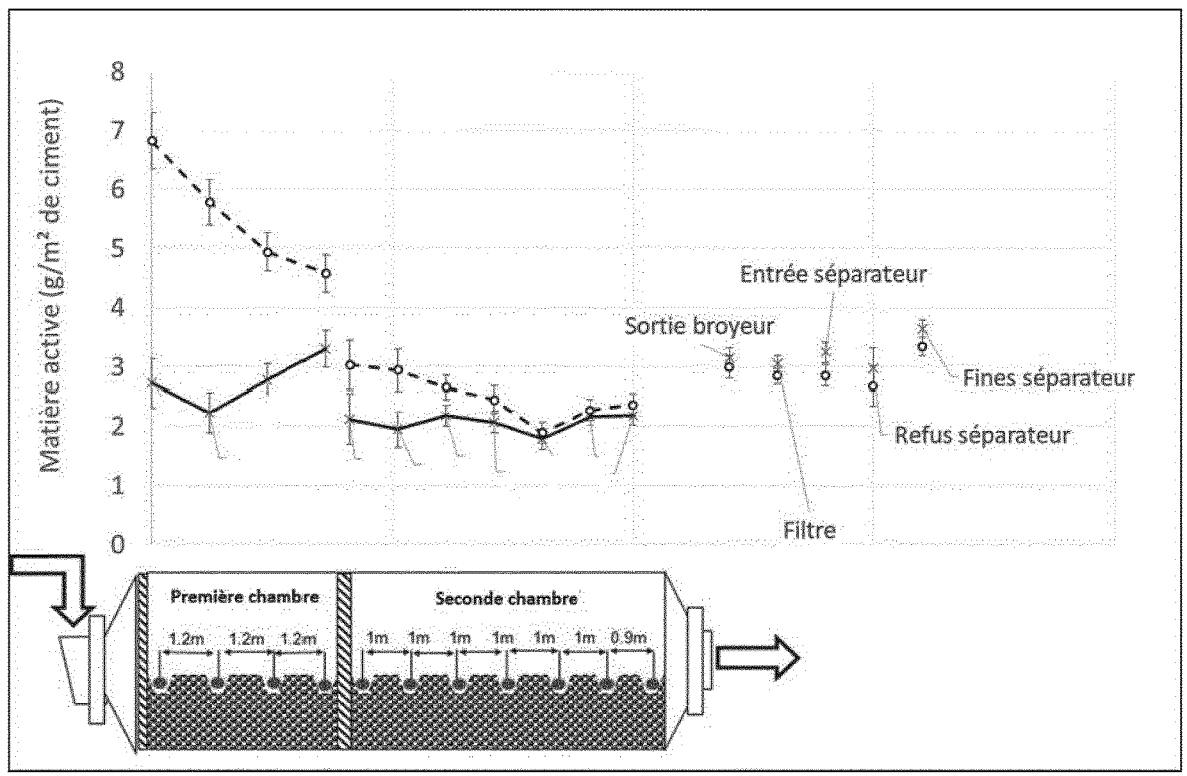
FIG. 6: Dosage of grinding aid (in dry g) measured per $m^2$ of cement in the chambers of the grinder and at different points of the unit where samples were taken. The crosses correspond to grinding aid A comprising an aminoalcohol and the circles to grinding aid B comprising an alkylene glycol.

Samples were taken every 1.2 m in the first chamber 12, and every metre in the second. The dosages of grinding aid per m² of cement are given in FIG. 6.

For grinding aid B comprising an alkylene glycol, the quantity decreases slightly in the first chamber 12 and then drops and stabilises in the second chamber 14. For grinding aid A comprising an aminoalcohol, this quantity increases in the first chamber 12 and stabilises in the second chamber 14.

Figure 7:
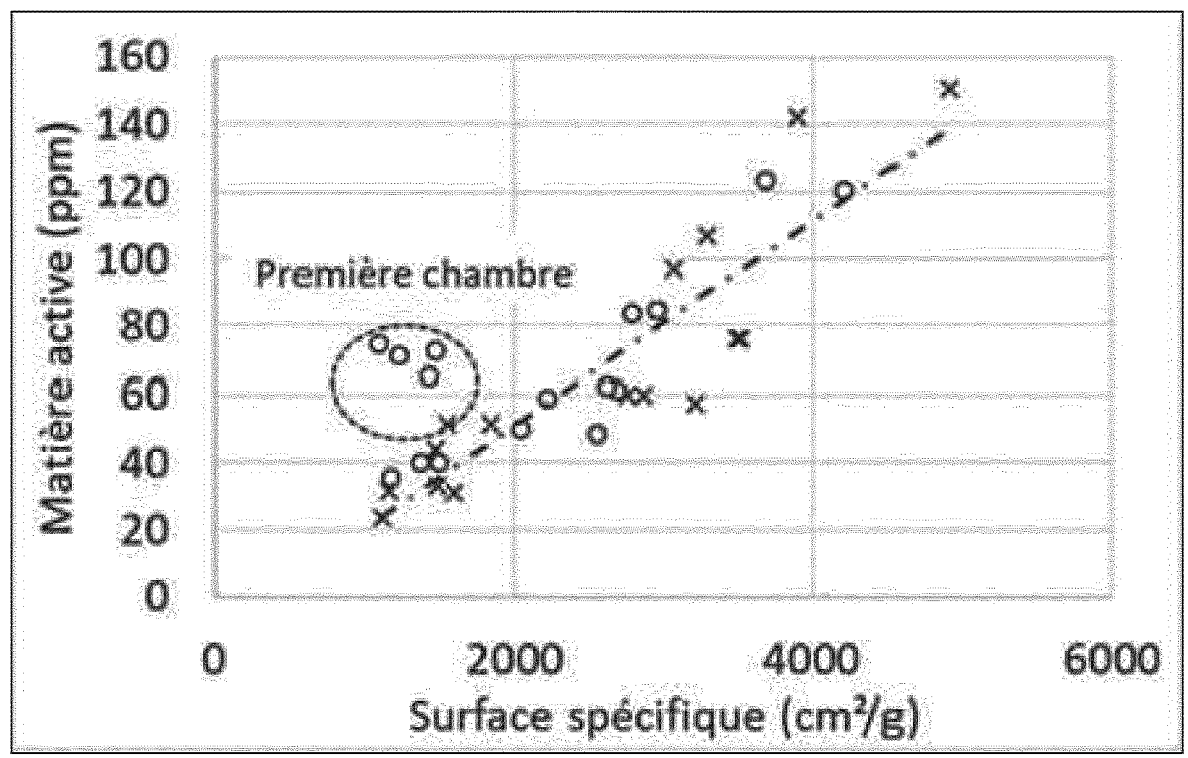
FIG. 7: Relationship between the quantity of grinding aid (in dry g) measured per tonne of cement on the samples and the specific surface area of the cement in $cm^2/g$. The crosses correspond to grinding aid A comprising an aminoalcohol and the circles to grinding aid B comprising an alkylene glycol.

In the first chamber 12 of the horizontal grinder 11, the quantity of grinding aid by weight of cement does not progress linearly with the specific surface area of the cement. This relationship becomes true as from the second chamber, as illustrated in FIG. 7.

Inside the horizontal grinder 11, the two grinding aids differ in the first chamber 12, grinding aid B comprising an alkylene glycol being more abundant per unit surface area than grinding aid A comprising aminoalcohol. The quantity of grinding aid per unit surface area of cement stabilises in the second chamber of the horizontal grinder 11, and the difference between the two grinding aids decreases.

Example 2

Materials

The studied cement was of CEM I 42.5R type (94% clinker; 5.5% gypsum; 5.5% limestone).

The grinding aids were specifically formulated for Example 2. Their compositions are given in Table 10 below. Grinding aid B1 is of same type as grinding aid A. Grinding aid B2 differs.

TABLE 10

Composition of grinding aids A, B1 and B2 used in Example 2.

| | Compounds | Active material (%) |
|---|---|---|
| Grinding aid A comprising an aminoalcohol | Water Triethanolamine Triisopropanolamine (diluted) | 8.33 33.33 |
| Grinding aid B1 comprising an aminoalcohol | Water Triethanolamine Triisopropanolamine (diluted) | 8.33 33.33 |
| Grinding aid B2 comprising an alkylene glycol | Water Diethylene glycol Glycerol (diluted) | 22.70 12.09 |

Figure 8:
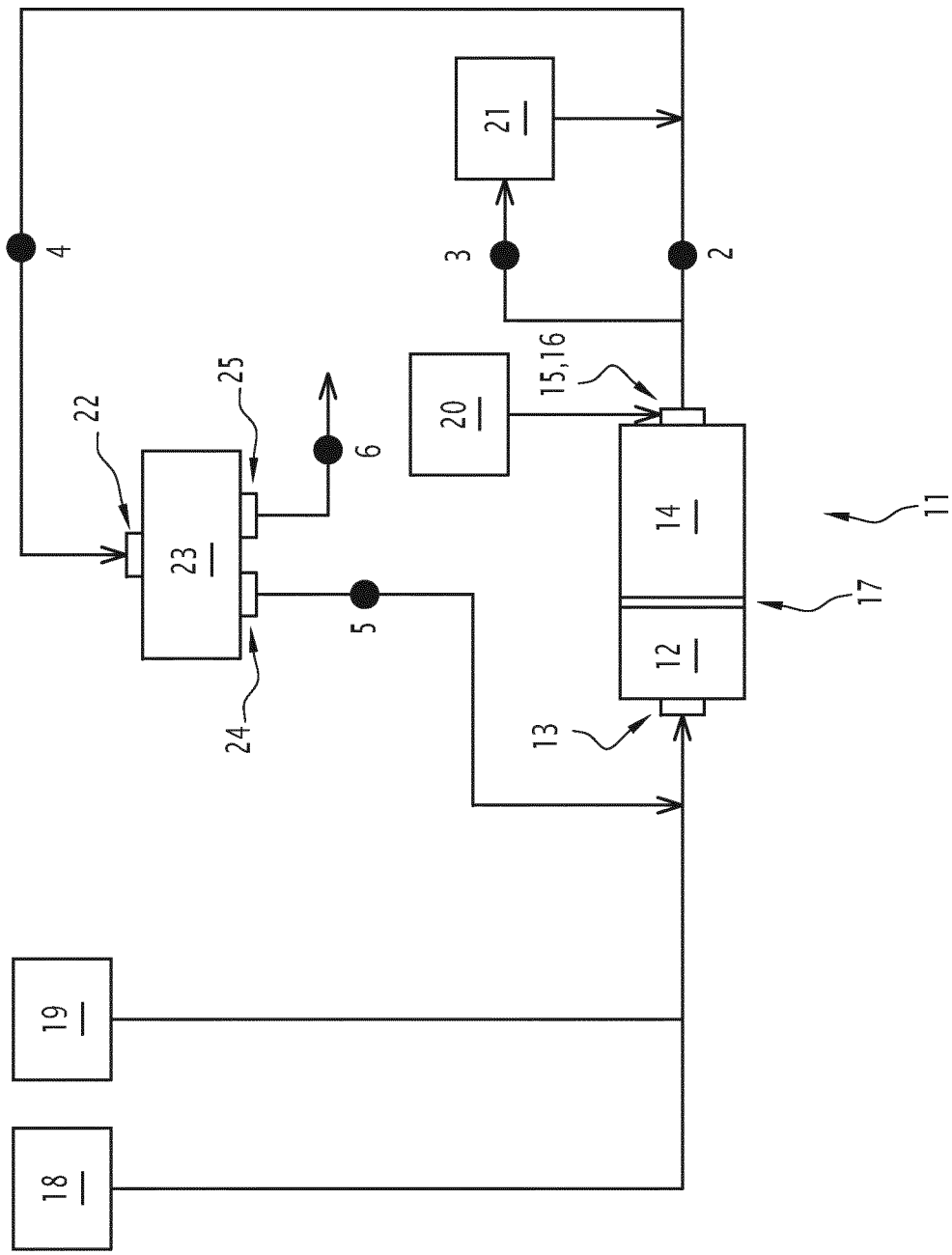
FIG. 8: Schematic of a grinding unit according to the second alternative and positions of sampling points in Example 2.

The grinding unit used was such as illustrated in FIG. 8. FIG. 8 is identical to FIG. 1 except that:

the sampling points 2 to 6 are shown in FIG. 8;

the inlet 15 of the second chamber 14, that is connected to the source 20 of composition A, is positioned at the discharge grate equipping the outlet 16 of the second chamber. The inlet 15 and outlet 16 are therefore at the same position.

The horizontal grinder 11 used comprised two chambers separated by a diaphragm 17.

In this second example, the advantage is shown of injecting grinding aids into each of the two chambers.

Different cases were tested:

either no grinding aid was injected (reference—test T1);

or grinding aid B1 was injected into inlet 13 of the first chamber and no grinding aid was injected into the second chamber (comparative—tests T2, T3 and T4);

or no grinding aid was injected into the first chamber and grinding aid A was injected at the discharge grate equipping the outlet 16 of the second chamber (comparative—tests T5 and T6);

or grinding aid B2 was injected via inlet 13 of the first chamber and no grinding aid was injected into the second chamber (comparative—test T8);

or grinding aid B was injected via inlet 13 of the first chamber and grinding aid A was injected at the discharge grate equipping the outlet 16 of the second chamber, via an injection tube on the axis of the discharge grate (invention—tests T7, T9 and T10), with two distinct cases:

either grinding aid B is B1 (same as grinding aid A) and the grinding aids injected into the first and second chamber are therefore of same type (test T7), or grinding aid B is B2 (differing from grinding aid A) and the grinding aids injected into the first and second chambers are of different type (tests T9 and T10).

Samples were taken at different points 2, 3, 4, 5 and 6 of the circuit illustrated in FIG. 8, once the state of equilibrium was reached on the grinding line.

Table 11 summarises all the tests conducted, initial dosages and points of injection.

TABLE 11

| Test | 1st chamber | | 2nd chamber | Samples taken in the grinder | Samples taken at points 2, 3, 4, 5, 6 |
| --- | --- | --- | --- | --- | --- |
| | Dosage of aid B1 (ppm) | Dosage of aid B2 (ppm) | Dosage of aid A (ppm) | | |
| T1 (ref) | 0 | 0 | 0 | X | X |
| T2 (comp) | 250 | 0 | 0 | | X |
| T3 (comp) | 350 | 0 | 0 | | X |
| T4 (comp) | 450 | 0 | 0 | X | X |
| T5 (comp) | 0 | 0 | 262 | | X |
| T6 (comp) | 0 | 0 | 350 | | X |
| T7 (inv) | 250 | 0 | 138 | | X |
| T8 (comp) | 0 | 300 | 0 | | X |
| T9 (inv) | 0 | 300 | 113 | | X |
| T10 (inv) | 0 | 300 | 199 | X | X |

The different flows were recorded at the sampling points of the circuit and percentage circulating load was calculated as the ratio between the flow of fresh material entering the circuit (here 48 tonnes/h in all tests) and the flow of material returned by the separator from outlet 24. This percentage measures the manner in which the process becomes saturated with material i.e. its relative congestion, and directly impacts efficiency. It is therefore sought to reduce this percentage so that it is possible to increase the flow rate of the method.

Particle size analyses on samples also allowed measurement of the fineness of the cement obtained at the outlet via rejects on 45 μm screen. The smaller the rejects the finer the cement.

The bypass values of the separator were also measured during the tests. The higher the value of parameter C, the better the quality of filtration at the separator.

Flow rate at the filter was also measured. The filter 21 can easily be saturated since it becomes charged with fine particles. It is therefore preferred to have a low flow rate at the filter 21.

All measurements are grouped together in Table 12.

TABLE 12

| Test | Percentage circulating load | C = 1-Bypass | Rejects at 45 μm | Flow at filter 21 (tonnes/h) |
| --- | --- | --- | --- | --- |
| T1 (ref) | 44.56% | 94% | 5.0 | 19.73 |
| T2 (comp) | 86.67% | 90% | 4.2 | 8.28 |
| T3 (comp) | 136.96% | 83% | 2.8 | 13.53 |

TABLE 12-continued

| Test | Percentage circulating load | C = 1-Bypass | Rejects at 45 μm | Flow at filter 21 (tonnes/h) |
|---|---|---|---|---|
| T4 (comp) | 244.75% | 73% | 1.0 | 7.25 |
| T5 (comp) | 97.02% | 89% | 3.2 | 13.38 |
| T6 (comp) | 114.58% | 87% | 2.0 | 13.74 |
| T7 (inv) | 98.83% | 89% | 2.0 | 3.53 |
| T8 (comp) | 68.04% | 91% | 3.4 | 16.86 |
| T9 (inv) | 77.96% | 90% | 4.0 | 8.61 |
| T10 (inv) | 71.79% | 91% | 2.8 | 11.00 |

The injection of grinding aid B1 into the first chamber without any injection into the second chamber (tests T2 to T4) allows a fine cement to be obtained (smaller rejects than for reference T1) but leads to a strong increase in circulating load and to strong degradation of filtering quality at the separator as shown by parameter C.

Injection of grinding aid A into the second chamber:
without an injection into the first chamber (tests T5 and T6),
or by injecting grinding aid B1 into the first chamber (test T7),
allows easing of the method with lower circulating loads and better separation factors C than those obtained in tests T2 to T4.

Injection of grinding aid B2 into the first chamber (test T8) allows a lower circulating load and good filtering quality at the separator. Nonetheless, the flow rate at the filter 21 is the highest. Test T8 places a heavier load on this filter than tests T9 and T10, meaning that the latter offer a better compromise.

The most efficient combination is injection of grinding aid B2 into the first chamber and of grinding aid A into the second chamber (tests T9 to T10), for which the lowest circulating loads, highest separation factors C and cements of acceptable fineness are obtained. The circulating loads and flow rates at the grinder outlet filter measured in tests T9 and T10 allow an increase in feed flow rate hence in the general productivity of the method without risk of saturating the method.

CONCLUSION

These results show that:
the quantity of grinding aid found on the cement particles is essentially governed by the specific surface area of the cement particles as soon as they leave the first chamber 12 of the horizontal grinder 11;

The more the initial dosage of grinding aid is increased, the more the quantity of grinding aid increases along the grinding line. However, for grinding aid A comprising an aminoalcohol, at an intermediate dosage D2, there is a greater quantity of grinding aid than initially added. This difference could be due to the fact that the filter 21 selects the particles of smallest size for which the concentration of grinding aid is the highest further to the developed area effect.

The loss of grinding aid along the grinding line increases with initial dosage, which could result from gas-solid adsorption at dynamic equilibrium in the horizontal grinder 11. To limit this loss, lower dosages should be used but the grinding aid would then not allow optimization of the parameters of the horizontal grinder 1 to reach the desired fineness.

Inside the horizontal grinder 1, the two grinding aids differ in the concentrations thereof in the first chamber 12, grinding aid B comprising an alkylene glycol being the most concentrated.

At the separator, grinding aid A comprising an aminoalcohol has a more favourable effect on the fish hook slope (β) and on bypass complement (C) than grinding aid B comprising an alkylene glycol. The intermediate dosage D2 of grinding aid A comprising and aminoalcohol already allows an efficiency plateau to be reached in the separator, contrary to grinding aid B comprising an alkylene glycol.

Injection of grinding aid A into the second chamber and of grinding aid B2 into the first chamber allowed obtaining of the best compromise between separator efficacy, circulating load, cement fineness and flow rate at the filter, compared with:
injection of grinding aid B1 into the first chamber without injecting any grinding aid into the second chamber;
injection of grinding aid B1 into the first chamber and of grinding aid B2 into the second chamber.

These results show the advantage of injecting the two grinding aids at different points along the grinding line: grinding aid B at the inlet 13 of the horizontal grinder 11 to allow a sufficiently long residence time of the cement in the horizontal grinder 11 without removing fines too rapidly, and grinding aid A comprising an aminoalcohol in the second chamber 14 of the horizontal grinder 11 for better fluidification of the powder in the separator line.

The invention claimed is:

1. A method for grinding a hydraulic binder by providing a horizontal grinder, comprising:
   a) introducing:
      a hydraulic binder, and
      a composition β comprising at least one grinding aid B',
      into a first chamber of the horizontal grinder comprising several chambers, including the first chamber and a last chamber, each chamber being separated from the adjacent chamber by a diaphragm,
   whereby a composition β comprising the hydraulic binder and composition B is obtained in the first chamber,
   b) grinding composition β in the horizontal grinder, whereby composition β moves from the first chamber to the last chamber and a ground composition C is obtained at an outlet of the last chamber,
   wherein the grinding step comprises introducing into the last chamber a composition A comprising at least one grinding aid A' comprising an aminoalcohol, composition A differing from composition β.

2. The method for grinding a hydraulic binder according to claim 1, comprising after step b):
   c) separating, by a separator, composition C ground into fines and separator rejects, where a mean size of the particles of the separator rejects is greater than that of the particles of the fines;

d) recovering the fines;

e) returning the separator rejects to the first chamber of the horizontal grinder.

3. The method for grinding a hydraulic binder according to claim 2, wherein the horizontal grinder only has two chambers.

4. The method for grinding a hydraulic binder according to claim 1, wherein the horizontal grinder only has two chambers.

5. The method for grinding a hydraulic binder according to claim 1, wherein the hydraulic binder is cement.

6. The method for grinding a hydraulic binder according to claim 1, wherein the grinding aid B' comprises a polyol.

7. The method according to claim 6, wherein the grinding aid B' comprises a polyol selected from the group consisting of:
a diol,
a triol,
a tetraol,
and a mixture thereof.

8. The method according to claim 7, wherein the diol is an alkylene glycol.

9. The method according to claim 8, wherein the alkylene glycol has 1 to 20 carbon atoms.

10. The method according to claim 7, wherein the grinding aid B' comprises an alkylene glycol having 1 to 20 carbon atoms, or a mixture thereof.

11. The method according to claim 7, wherein the polyol of grinding aid B' is selected from among:
a diol selected from among 2-methyl-1,3-propanediol, monoethyleneglycol, diethyleneglycol, triethyleneglycol, tetraethyleneglycol, propylene glycol and a mixture thereof,
a triol, which is glycerol,
a tetraol, which is erythritol.

12. The method for grinding a hydraulic binder according to claim 1, wherein grinding aid B' comprises:
an aminoalcohol or one of the salts thereof, and
a carboxylic acid or salt thereof.

13. The method grinding a hydraulic binder according to claim 12, wherein the aminoalcohol of the grinding aid B' comprises:
from 2 to 8 carbon atoms, and/or
1, 2 or 3 alcohol functions.

14. The method for grinding a hydraulic binder according to claim 13, wherein the aminoalcohol of the grinding aid B' is N-methyldiethanolamine (MDEA), diisopropanolamine (DIPA), triisopropanolamine (TIPA), triethanolamine (TEA), ethanol-diisopropanolamine (EDIPA), diethanolisopropanolamine (DEIPA) or a mixture thereof.

15. The method for grinding a hydraulic binder according to claim 1, wherein the aminoalcohol of grinding aid A' comprises:
from 2 to 8 carbon atoms, and/or
1, 2 or 3 alcohol functions.

16. The method for grinding a hydraulic binder according to claim 1, wherein composition A is injected into the last chamber;
either at the diaphragm separating the last chamber from the adjacent chamber,
or into the enclosure of the last chamber,
or at the outlet of the last chamber.

17. The method for grinding a hydraulic binder according to claim 1, wherein the hydraulic binder is cement comprising mineral additions.

18. The method for grinding a hydraulic binder according to claim 1, wherein grinding aid B' comprises an aminoalcohol or one of the salts thereof.

* * * * *